(12) United States Patent
Liu et al.

(10) Patent No.: US 6,608,301 B2
(45) Date of Patent: Aug. 19, 2003

(54) SINGLE STEP MULTI-SECTION EXPOSURE SCANNING METHOD

(75) Inventors: Rong-Ji Liu, Taichung (TW); Kuo-Jeng Wang, Kaohsiung (TW); Tom-Chin Chang, Yun-Lin County (TW)

(73) Assignee: Umax Data Systems, Inc., Hsinchu (TW)

(*) Notice: Subject to any disclaimer, the term of this patent is extended or adjusted under 35 U.S.C. 154(b) by 51 days.

(21) Appl. No.: 09/920,388

(22) Filed: Jul. 31, 2001

(65) Prior Publication Data

US 2003/0025073 A1 Feb. 6, 2003

(51) Int. Cl.$^7$ .................... H01J 3/14; H01L 27/00; H04N 1/46; H04N 1/04
(52) U.S. Cl. .................... 250/234; 250/208.1; 358/505; 358/513; 358/482
(58) Field of Search ................ 250/234, 208.1; 358/505, 513, 514, 482, 483

(56) References Cited

U.S. PATENT DOCUMENTS 5,483,053 A * 1/1996 Johnson et al.
5,750,985 A * 5/1998 Suzuki

FOREIGN PATENT DOCUMENTS

| EP | 1 017 240 A2 | * 12/1999 |
| EP | 1 096 785 A2 | * 6/2000 |

* cited by examiner

Primary Examiner—David Porta
Assistant Examiner—David C Meyer
(74) Attorney, Agent, or Firm—J.C. Patents

(57) ABSTRACT

A single step multi-section exposure scanning method for a scanner. The scanner includes a photo-sensor and a stepper motor. The photo-sensor has N rows of sensor cells that correspond to each primary color. The scanning device is driven forward an exposure distance for each revolution of the stepper motor. The single step multi-section exposure scanning method includes the following steps. First, the photo-sensor moves forward one exposure distance. One row of sensor cells is exposed after moving every 1/Nth of the exposure distance. Thereafter, analogue voltages obtained through the exposed row of sensor cells are transmitted to an analogue/digital converter. The above process is repeated until the entire document is scanned.

5 Claims, 3 Drawing Sheets

SINGLE STEP MULTI-SECTION EXPOSURE SCANNING METHOD

BACKGROUND OF THE INVENTION

1. Field of the Invention

The present invention relates to a scanning method. More particularly, the present invention relates to a single step multi-section exposure scanning method.

2. Description of Related Art

In general, a charge-coupled device (CCD) is used as the photosensitive element inside most color scanners. The color CCD is constructed using a large number of sensor cells each capable of sensing light intensity of one of the three primary colors including red (R), green (G) and blue (B). FIG. 1 is a schematic diagram of a conventional charge-coupled device (CCD). As shown in FIG. 1, the CCD includes a first row of sensor cells 102 and a second row of sensor cell 104 for detecting intensity of the primary color red (R), a third row of sensor cells 106 and a fourth row of sensor cells 108 for detecting intensity of the primary color green (G) and a fifth row of sensor cells 110 and a sixth row of sensor cell 112 for detecting intensity of the primary color (B). After a period of exposure, each sensor cell accumulates a definite amount of electric charges according to the intensity of light falling on the particular sensor cell.

FIG. 2 is a schematic diagram showing a conventional scanning circuit of a scanner. As shown in FIG. 2, a sensor 202 converts the electric charges accumulated inside the CCD (not shown) into an analogue voltage signal. Through an analogue/digital converter 204, the analogue voltage signal is converted to a digital voltage signal. Thereafter, an application specific integrated circuit 206 initiates a computation of the compensation value supplied from a compensation RAM unit 210 and the digital voltage signal. The computed video signal is transferred to a video RAM unit 208 for storage. In a subsequent step, the application specific integrated circuit 206 reads out video signal data from the video RAM unit 208 and transmits the video signal data to an input/output port 212.

Resolution of a scanner is an important parameter for judging the quality of a scanner. However, the production of a high-resolution scanner often causes some critical problems including: (1) lamp-adjusting techniques have to be deployed to resolve sensor saturation problem because long exposure will lead to saturation of the CCD while short exposure will lead to insufficient time for outputting voltage signal; (2) using a run-stop-scan scanning method to scan a document not only leads a repetition of start, rotate and stop motion for the stepper motor, but also leads to a slow down of scanning speed; (3) the CCD generates a large quantity of voltage signal data so that storage capacity of the compensation memory has to increase, thereby restricting large area scanning for obtaining a higher resolution; (4) the generation of large quantity of voltage signal data by the CCD also necessarily increases the storage capacity of the video RAM unit.

SUMMARY OF THE INVENTION

Accordingly, one object of the present invention is to provide a single step multi-section exposure scanning method capable of reducing compensation memory and video memory capacity and does not rely on lamp-adjusting techniques to solve sensor saturation problem. Ultimately, hardware production and engineering cost is reduced and fewer compensation counters are used. Furthermore, a larger area scanning to support a high image resolution is possible and the scanner can have a higher scanning speed.

To achieve these and other advantages and in accordance with the purpose of the invention, as embodied and broadly described herein, the invention provides a single step multi-section exposure scanning method for a scanner. The scanner includes a photo-sensor and a stepper motor. The photo-sensor has N rows of sensor cells that correspond to each primary color. The scanning device is driven forward an exposure distance for each revolution of the stepper motor. The single step multi-section exposure scanning method includes the following steps. First, the photo-sensor moves forward one exposure distance. One row of sensor cells is exposed after moving every 1/Nth of the exposure distance. Thereafter, analogue voltages obtained by the exposed row of sensor cells are transmitted to an analogue/digital converter. The above process is repeated until the entire document is scanned.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
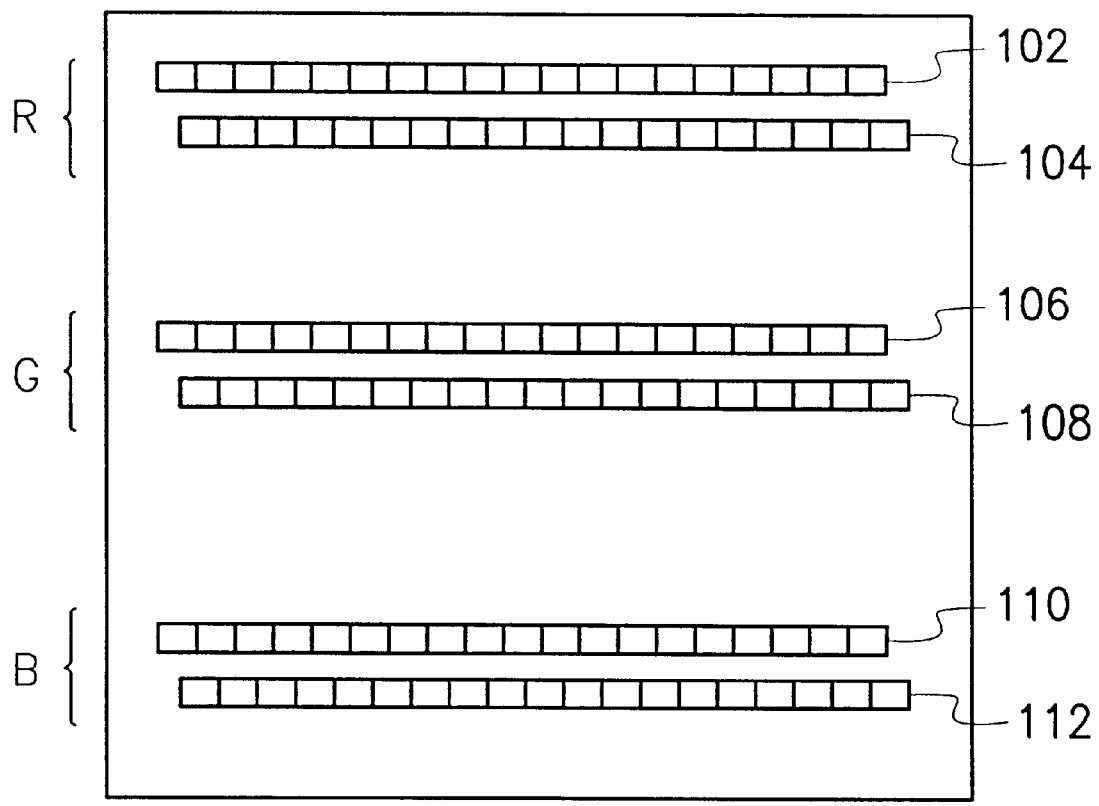
FIG. 1 is a schematic diagram of a conventional charge-coupled device (CCD)

Reference will now be made in detail to the present preferred embodiments of the invention, examples of which are illustrated in the accompanying drawings. Wherever possible, the same reference numbers are used in the drawings and the description to refer to the same or like parts.

In one embodiment of this invention, the scanner has a photo-sensor and a stepper motor. The charge-coupled device (CCD) inside the photo-sensor is capable of sensing three primary colors red (R), green (G) and blue (B). Furthermore, each primary color is sensed by N rows sensor cells (refer to FIG. 1, N=2, 3, . . . ). In general, the photo-sensor moves forward a distance L (that is, the distance a scanning head moves over a scan document) when the stepper motor rotates once. During this interval, the N rows of sensor cells for each primary color must detect intensity of light reflected from a strip of scan document having a width.

Figure 2:
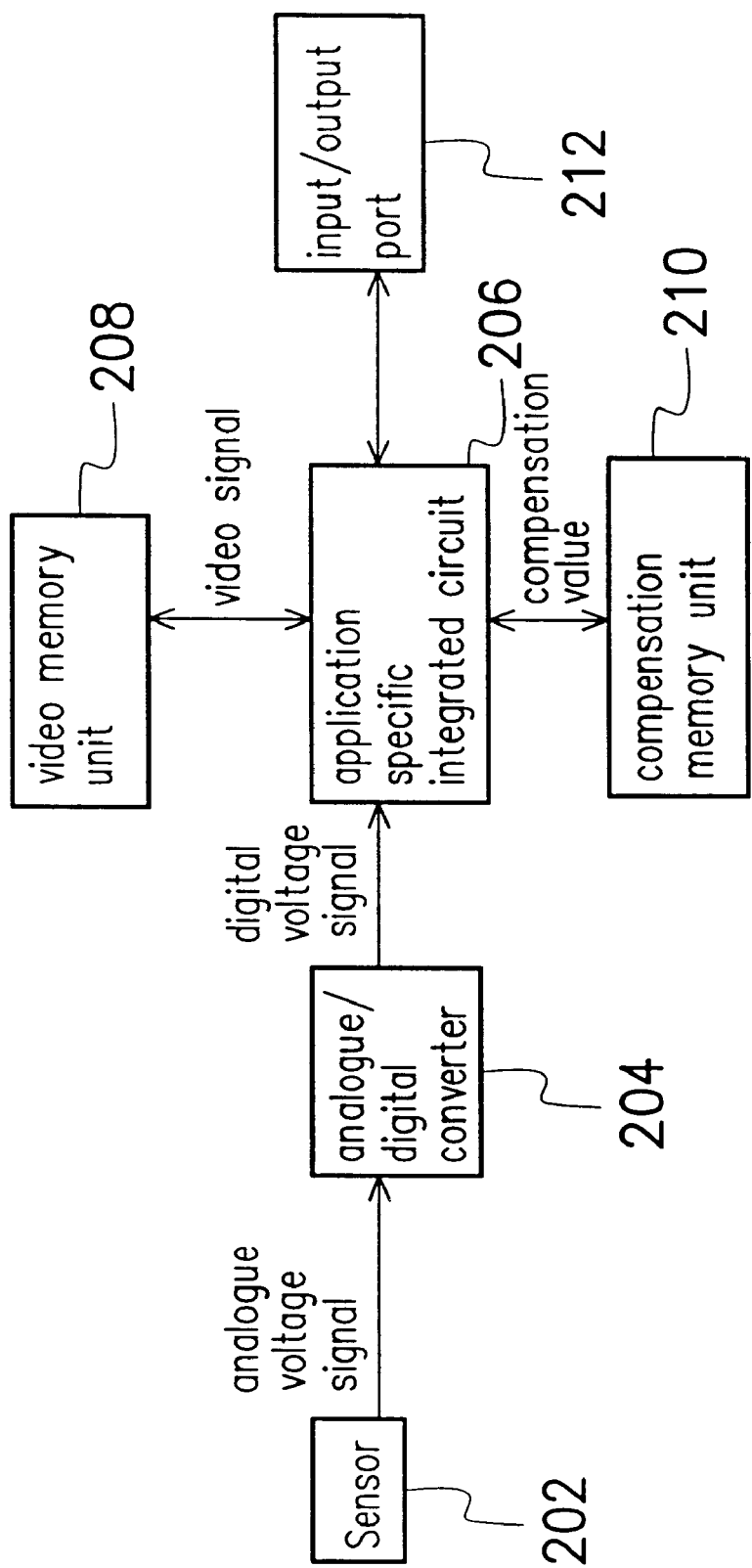
FIG. 2 is a schematic diagram showing a conventional scanning circuit of a scanner.
Figure 3:
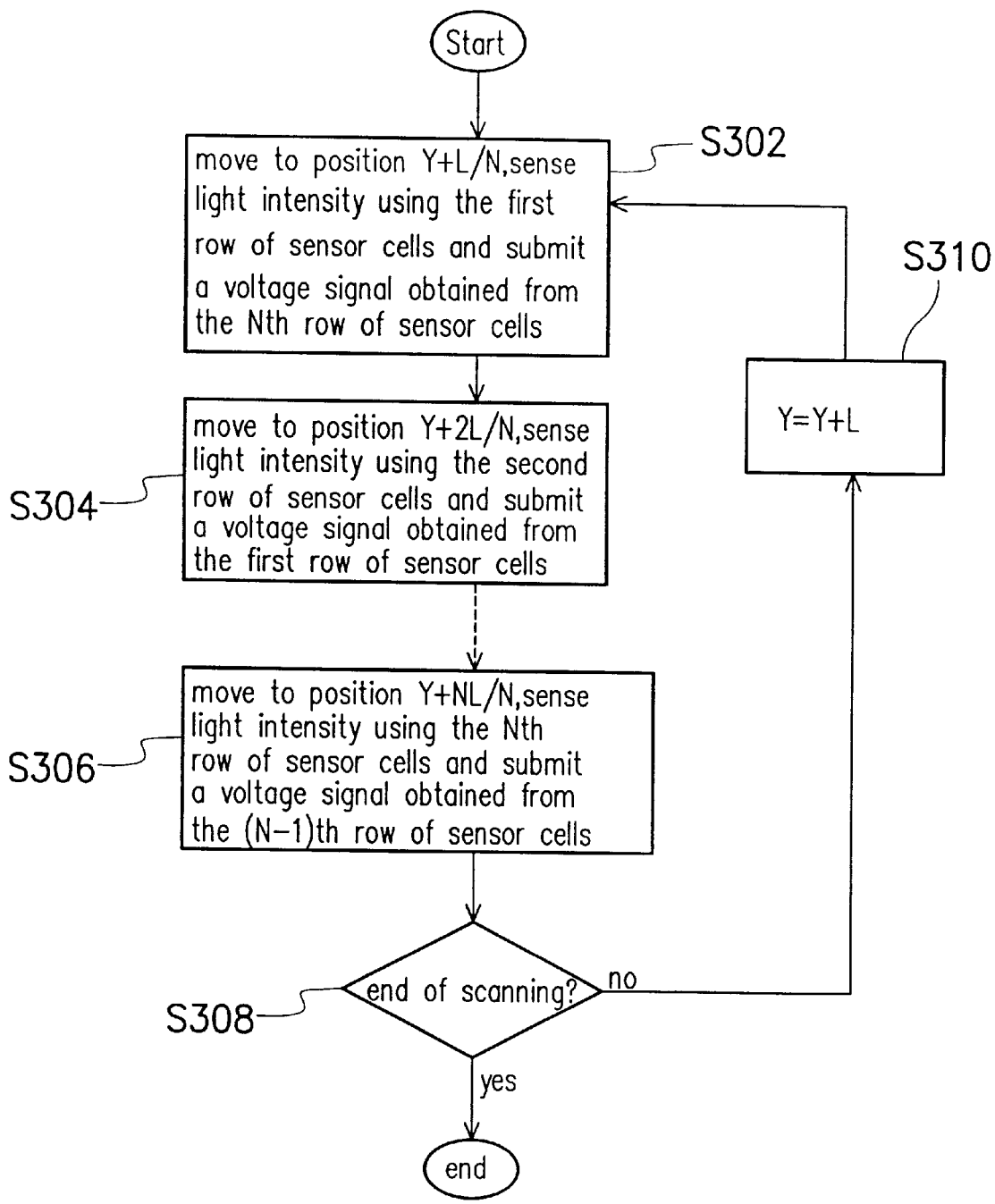
FIG. 3 is a schematic diagram showing a single step multi-section exposure scanning method according to one preferred embodiment of this invention.

FIG. 3 is a schematic diagram showing a single step multi-section exposure scanning method according to one preferred embodiment of this invention. When the scan document is at position Y (can be the beginning or any position of the scan document), one rotation of the stepper motor is equivalent to moving the scan document from the position Y to a new position Y+L/N. While the stepper motor rotates, if position Y is at the beginning of the scan document, the first row of sensor cells picks up reflected light from the document. However, if position Y is not at the starting point of scanning, the Nth row of sensor cells converts the accumulated charges resulting from light absorption into analogue voltage signals. The analogue voltage signals are transferred to an analogue/digital converter 204 (as shown in FIG. 2) (S302).

The stepper motor continues to rotate bringing the scan document from position Y+L/N to a new position Y+2L/N. While the stepper motor rotates, the second row sensor cells picks up light reflected from the scan document. The first row sensor cells convert the accumulated charges resulting from light absorption into analogue voltage signals. The analogue voltage signals are transferred to the analogue/digital converter 204 (as shown in FIG. 2) (S304).

The stepper motor continues to run so that the sensor cells sequentially absorb reflected light from the scan document and submit analogue voltage signals until the scan document moves from position Y+(N−1)L/N to position Y+NL/N. While the stepper motor rotates, the Nth row sensor cells pick up reflected light from the scan document and the (N−1)th row sensor cells convert the accumulated charges resulting from light absorption into analogue voltage signals. The analogue voltage signal is transmitted to the analogue/digital converter 204 (shown in FIG. 2) (S306). In other words, each time the stepper motor completes a rotation, accumulated electric charges resulting from light absorption by the N rows of sensor cells are converted to an analogue voltage signal and transmitted to the analogue/digital converter 204 (shown in FIG. 2).

After the Nth row of sensor cells detects intensity of light reflected from the scan document, the scanner decides if that is the end of the scanning operation (that is, the scanner has scanned to the end of the document) (S308). If scanning is not yet complete, current position (position Y plus motor rotation distance L) is chosen as the initial position (Y=Y+L) (S310) of the next rotation. Step S302 is executed again. On the other hand, if scanning is complete, accumulated electric charges resulting from light absorption by the Nth row sensor cells are converted to analogue voltage signals and transmitted to the analogue/digital converter 204 (as shown in FIG. 2).

For a scanner having a staggered CCD design, two rows of light sensors are used for detecting intensity of each primary color. Hence, the aforementioned single step multi-section exposure scanning method has an N equal 2 for this type of scanner.

Since intensity of light reflected from the document is sensed by a row of sensors, the effect of exposure time is minimized. Because saturation problems no longer have to be resolved by implementing lamp-adjusting techniques, hardware and engineering cost is reduced. After detecting the reflected light from the scan document by the Nth row of sensors (N=1, 2, 3, . . . ), the accumulated charges due to light falling on the (N−1)th row of sensors are converted to analogue voltage signal. Thereafter, the analogue voltage signal is transferred to the analogue/digital converter 204 (as shown in FIG. 2). The analogue/digital converter 204 converts the analogue voltage signals into digital voltage signals. A computation of the digital voltage signals with a compensation value submitted from the compensation memory unit 210 is carried out inside the application specific integrated circuit 206. Since the amount of data undergoing compensation computation inside the application specific integrated circuit 206 comes from a row of sensors, storage capacity of the compensation memory unit and the number of compensation counters required for computation are greatly reduced. Hence, a larger area can be scanned to obtain a higher resolution. Video signals obtained from compensation computation inside the application specific integrated circuit 206 are transferred to the video RAM unit 208 for temporary storage. The application specific integrated circuit 206 is also responsible for reading out video data from the video RAM unit 208 and sending the data to the input/output port 212. Using a run-and-scan scanning method, the stepper motor can rotate continuously without repetitive starts and stops. Ultimately, scanning speed of the scanner is increased.

In summary, major advantages of this invention includes:
1. There is no need to apply lamp-adjusting techniques to minimize sensor saturation problem. Hence, hardware and engineering cost is reduced.
2. Storage capacity of the compensation memory unit as well as the number of compensation counters required to conduct computation is reduced. Thus, large area scanning can be conducted to obtain a higher resolution.
3. Using a run-and-scan scanning method, the stepper motor can run continuously leading to a higher scanning speed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A single step multi-section exposure scanning method for a scanner having a photo-sensor and a stepper motor, wherein the photo-sensor uses N rows of sensors to process each one of a plurality of primary colors and the stepper motor drives the photo-sensor an exposure distance L for one step of the stepper motor, the scanning method comprising the steps of:

moving an exposure distance along a scan document;

exposing a row of not yet exposed sensor cells after moving each 1/Nth of the exposure distance L;

sending out an analogue voltage obtained from a previous row of sensors when the next row of sensors is exposed; and repeating the above steps until the entire document is scanned, whereby for one step of the stepper motor moving the exposure distance L, N sequential times of exposure with respect to the N rows for the primary color are performed.

2. The scanning method of claim 1, wherein the value of N is 2.

3. The scanning method of claim 1, wherein the photo-sensor is able to detect light intensity of all three primary colors including red (R), green (G) and blue (B).

4. The scanning method of claim 3, wherein the photo-sensor uses a staggered charge-coupled device to detect light intensity of the primary colors red (R), green (G) and blue (B).

5. The scanning method of claim 3, wherein the row of sensor cells use the accumulated electric charges produced according to light intensity to generate analogue voltages.

* * * * *